(12) United States Patent
Hayashi et al.

(10) Patent No.: US 7,494,689 B2
(45) Date of Patent: Feb. 24, 2009

(54) METHOD FOR MANUFACTURING A BIREFRINGENT FILM

(75) Inventors: Masaki Hayashi, Ibaraki (JP); Nao Murakami, Ibaraki (JP); Yuuichi Nishikouji, Ibaraki (JP); Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 778 days.

(21) Appl. No.: 10/940,622

(22) Filed: Sep. 15, 2004

(65) Prior Publication Data

US 2005/0058781 A1    Mar. 17, 2005

(30) Foreign Application Priority Data

Sep. 16, 2003  (JP) ............................. 2003-323597

(51) Int. Cl.
*B05D 5/06* (2006.01)
(52) U.S. Cl. .................... 427/162; 427/163.1; 349/123; 349/124
(58) Field of Classification Search ................. 427/162, 427/163.1; 349/123, 124; 34/448, 451
See application file for complete search history.

(56) References Cited

U.S. PATENT DOCUMENTS

| | | | | |
|---|---|---|---|---|
| 5,071,997 A | | 12/1991 | Harris | 528/353 |
| 5,480,964 A | | 1/1996 | Harris et al. | 528/353 |
| 5,808,798 A | * | 9/1998 | Weber et al. | 359/583 |
| 7,244,465 B2 | * | 7/2007 | Kondou et al. | 427/162 |

FOREIGN PATENT DOCUMENTS

| | | |
|---|---|---|
| EP | 1 160 591 | 5/2001 |
| JP | 8-337665 A | 12/1996 |
| JP | 8-511812 | 12/1996 |
| JP | 10-508048 | 8/1998 |
| JP | 11-60732 A | 3/1999 |
| JP | 2000-190385 | 7/2000 |
| JP | 2000-190385 A | 7/2000 |
| JP | 2000-511296 | 8/2000 |
| JP | 2001-49110 | 2/2001 |
| JP | 2001-343529 | 12/2001 |
| WO | WO 94/24191 | 10/1994 |
| WO | WO 96/11967 | 4/1996 |
| WO | WO 97/44704 | 11/1997 |

OTHER PUBLICATIONS

Office Action of Corresponding Japanese Patent Application No. JP 2003-323597 mailed Oct. 22, 2007.

* cited by examiner

*Primary Examiner*—Alain L Bashore
(74) *Attorney, Agent, or Firm*—Westerman, Hattori, Daniels & Adrian, LLP.

(57) ABSTRACT

It is an object of the present invention to provide a method for manufacturing a birefringent film that can reduce the amount of a remaining solvent in the birefringent film without degrading appearance uniformity or an alignment in its thickness direction. The method of the present invention for manufacturing an optical film includes the steps of: coating a base with a polymer solution obtained by dissolving a polyimide-containing polymer in a solvent so as to form a coating film; and drying the coating film so as to form a birefringent film, in which the drying step includes at least two stages of drying processes. The drying step preferably include two stages of the drying processes, and a temperature in the former stage of the drying process is preferably lower than a temperature in the latter stage of the drying process. If adding a step of providing the birefringent film with an anisotropy of a refractive index in an in-plane direction, a birefringent film with an optical biaxiality can be manufactured.

10 Claims, 1 Drawing Sheet

METHOD FOR MANUFACTURING A BIREFRINGENT FILM

FIELD OF THE INVENTION

The present invention relates to a method for manufacturing a birefringent film using polyimide, an optical film including a birefringent film manufactured by the method, a laminated polarizing plate using the birefringent film, and an image display apparatus using the birefringent film and/or the laminated polarizing plate.

BACKGROUND OF THE INVENTION

Nowadays, in image display apparatuses such as monitors of personal computers, TV sets and the like, use of TFT driving display apparatuses in a vertically aligned (VA) mode has increased. This VA mode has unfavorable characteristics in which a contrast from an oblique direction deteriorates and tone reversal occurs at a black displaying part while displaying in black (while applying an electric charge). In order to improve this angular dependence of display quality, an optical film including a birefringent film such as a retardation plate that shows an optical biaxiality is generally disposed between two polarizing plates in a liquid crystal panel.

The birefringent film with an optical biaxiality may be manufactured by a method using a polymer material such as polyimide or the like, more specifically, a method including the steps of coating a base with a polymer solution obtained by dissolving the polymer material in a solvent; drying the thus obtained coating film so as to form a birefringent film with an optical negative uniaxiality; and stretching the birefringent film so as to obtain a birefringent film with an optical biaxiality, is disclosed (for example, see JP8(1996)-511812A). Also, a method for manufacturing the birefringent film with an optical biaxiality having high uniformity, which can control distribution of a refractive index easily, is disclosed (for example, see JP2000-190385A).

SUMMARY OF THE INVENTION

However, according to these manufacturing methods, there is a risk that a solvent of the polymer solution remains in the birefringent film, which may lead to instability of a retardation value of the film, deterioration in transparency of the film or the like over the course of time in proportion to the amount of the remaining solvent. Whereas, if the coating film is dried at a high temperature, aiming to reduce the amount of the remaining solvent so as to stabilize optical characteristics, problems may occur to the obtained film, such as deterioration of an alignment in its thickness direction, coloration, bubbling and the like.

Accordingly, it is an object of the present invention to provide a method for manufacturing a birefringent film that can reduce the amount of a remaining solvent without degrading appearance uniformity or an alignment in its thickness direction.

In order to attain the above-mentioned object, the manufacturing method of the present invention includes the steps of forming a coating film by coating on a base a polymer solution prepared by dissolving a polyimide-containing polymer in a solvent; and drying the coating film so as to form a birefringent film, in which the drying step includes at least two stages of drying processes.

According to the manufacturing method of the present invention, the coating film is subjected to at least two stages of the drying processes in the drying step, thus reducing the amount of the remaining solvent without degrading the appearance uniformity of the obtained birefringent film. The at least two stages may include stages at different temperatures, for example, a former stage at a relatively low temperature and a latter stage at a relatively high temperature, or a former stage at a relatively high temperature and a latter stage at a relatively low temperature. Therefore, a change of a retardation value over the course of time due to the remaining solvent can be suppressed, whereby an optical film including a birefringent film that have an excellent stability of optical characteristics such as a retardation value in a thickness direction and the like can be provided. In addition, the manufacturing method of the present invention can provide a birefringent film showing a large retardation value in the thickness direction, which can accordingly reduce a thickness of the optical film. Therefore, use of this optical film also enables to reduce, for example, thicknesses of various image display apparatuses, as well as manufacturing cost thereof.

BEST MODE FOR CARRYING OUT THE INVENTION

Figure 1A:
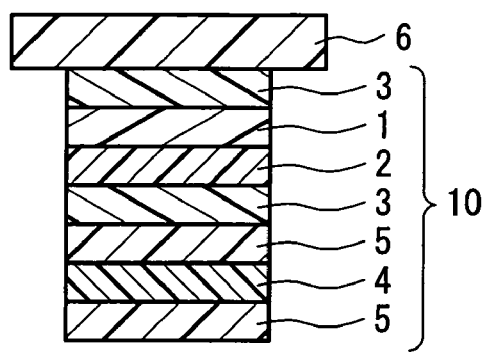
FIGS. 1A-1D are cross sectional views showing examples of a configuration of the laminated polarizing plate of the present invention with a liquid crystal cell.

The manufacturing method of the present invention includes, as mentioned above, the steps of forming a coating film by coating on a base a polymer solution prepared by dissolving a polyimide-containing polymer in a solvent; and drying the coating film so as to form a birefringent film. The drying step includes at least two stages of drying processes. A specific example of the manufacturing method of the present invention will be described below.

1: Coating Step

First, a polymer containing polyimide is dissolved in a solvent so as to prepare a polymer solution, which is subsequently applied onto a base so as to form a coating film. A blend ratio of the polymer to the solvent is, for example, 5 to 50 parts by weight, and preferably 10 to 40 parts by weight with respect to the solvent of 100 parts by weight, because the solution with this blend ratio provides a suitable viscosity for coating. Materials to be used, such as polyimide, other polymers, solvents, bases and the like, will be described below.

The coating process can be performed by, for example, spin coating, roller coating, flow coating, printing, dip coating, film flow-expanding, bar coating, gravure printing or the like, as appropriate. A method of superimposing a polymer layer can be adopted, as necessary.

2: Drying Step

Next, a coating film formed on the base is subjected to a drying process, and then is fixed, thereby forming, on the base, a birefringent film with an optically negative uniaxiality (nx>nz, ny>nz). Here, nx, ny, nz indicate refractive indices in an X-axis direction, a Y-axis direction and a Z-axis direction of the birefringent film, respectively. The X-axis corresponds to an axial direction exhibiting a maximum refractive index within a plane of the birefringent film, the Y-axis corresponds to an axial direction perpendicular to the X-axis within the plane, and the Z-axis corresponds to a thickness direction perpendicular to the X-axis and the Y-axis.

In the present invention, the drying step is required to include at least two stages of drying processes. Though the number of the stages is not particularly limited, but it ranges, for example, from 2 to 30, preferably ranges from 2 to 20, and more preferably ranges from 2 to 10.

Specific examples of the two stages of the drying process will be described below. Hereinafter, the first stage of the drying processes will be called a former cure, and the second stage will be called a latter cure.

A processing temperature in the former cure is, for example, preferably 40° C. or higher and lower than 150° C., more preferably ranges from 40° C. to 120° C., inclusive, and further preferably ranges from 40° C. to 100° C., inclusive. When a drying temperature in the former cure is lower than 150° C., the latter cure described below is further performed, thus reducing the amount of a remaining solvent in the birefringent film without degrading appearance uniformity, and realizing a larger retardation in its thickness direction. When the drying temperature in the former cure is 40° C. or higher, an effect of outside air temperature is small, thus reducing an effect of temperature variation.

A processing time of the former cure ranges, for example, from 0.5 to 10 minutes, preferably ranges from 0.5 to 8 minutes, and more preferably ranges from 0.5 to 5 minutes.

The amount of the remaining solvent in the birefringent film after the former cure preferably ranges from 2 to 10 wt %, more preferably ranges from 2 to 8 wt %, and particularly preferably ranges from 2 to 5 wt %. When the amount of the remaining solvent is between 2 and 10 wt %, the latter cure described below is further performed so as to reduce the amount of the remaining solvent without degrading the appearance uniformity, and obtain a large retardation value in a thickness direction.

Here, the amount of the remaining solvent is determined by dividing (a weight of the remaining solvent in the birefringent film) by (a weight of the birefringent film including the remaining solvent). The weight of the birefringent film including the remaining solvent can be obtained by, for example, peeling off the birefringent film from the base, disposing the birefringent film in an aluminum cup or the like, and measuring the weight of the film in the aluminum cup. The weight of the remaining solvent in the birefringent film can be obtained from, for example, a difference between a weight measured, after heating at 200° C. for 2 hours, the aluminum cup containing the peeled birefringent film, and the weight of the birefringent film including the remaining solvent.

A processing temperature in the latter cure is preferably, for example, 150° C. or higher and lower than 350° C., more preferably ranges from 150° C. to 300° C., inclusive, and further preferably ranges 150° C. to 200° C., inclusive. When the processing temperature in the latter cure is 150° C. or higher, for example, the amount of the remaining solvent in the film can be reduced. And when the drying temperature is lower than 350° C., the birefringent film can be dried without degrading thickness uniformity or transparency.

A processing time in the latter cure ranges, for example, from 1 to 60 minutes, preferably ranges from 1 to 40 minutes, and more preferably ranges from 1 to 30 minutes.

The amount of the remaining solvent in the birefringent film after the latter cure is preferably 3 wt % or less, more preferably 2 wt % or less, and particularly preferably 1 wt % or less. When the amount of the remaining solvent in the birefringent film after the latter cure is 3 wt % or less, the manufactured optical film can be provided with, for example, excellent optical transparency, heat resistance, flexibility, moisture resistance, mechanical strength, stability of optical characteristics and the like.

Also, if the drying step includes three stages, a drying temperature in a first stage preferably ranges from 50 to 90° C., in a second stage, it preferably ranges from 100 to 130° C., and in a third stage, it preferably ranges from 140 to 350° C.

According to the above-mentioned method, the birefringent film of the present invention with an optically negative uniaxiality (nx=ny>nz) can be manufactured on the base. The manufacturing method of the present invention further can include a step of providing the below-described anisotropy to the birefringent film. In this step, if an anisotropy of a refractive index in an in-plane direction is provided to the birefringent film, the birefringent film with an optical uniaxiality can be converted into a birefringent film with an optical biaxiality (nx>ny>nz), thereby widening the use of the optical film of the present invention. An example of the step of providing the anisotropy will be described below.

3. Step of Providing an Anisotropy

Examples of an alignment process for providing an anisotropy of a refractive index in an in-plane direction further to the thus formed birefringent film include a stretching treatment, a shrinking treatment and the like. These treatments can be performed at the same time as the drying step. Preferable examples of the stretching method include stretching the film uniaxially in the longitudinal direction of the birefringent film (free-end longitudinal stretching), and stretching the film uniaxially in the transverse direction while the film is fixed in the longitudinal direction of the birefringent film (fixed-end transverse stretching). Additional examples include stretching the film both in the longitudinal and transverse directions (sequential or concurrent biaxial stretching). Among them, in the case where the base on which the birefringent film is formed is stretchable, it is preferable to stretch the birefringent film in accordance with the stretch of the base. According to this method, the base can be stretched uniformly due to a tension applied to the base, and in accordance with this stretch of the base, the birefringent film indirectly can be stretched uniformly. This method is applicable for continuous production processes, thus being preferable also from aspects of raising mass-productiveness of manufactures and the like. Alternatively, the base and the birefringent film may be stretched together.

Examples of the shrinking method include shrinking the birefringent film on the base indirectly by shrinking the base using, for example, an anisotropic dimensional change of the base or a high shrinking property of the base. A shrinking rate is preferably controlled by using, for example, a stretching machine or the like. This control is performed by, for example, opening a clip of the stretching machine temporarily so as to relax the birefringent film in a direction for transferring the base, or narrowing a pitch of the clips of the stretching machine gradually. Another example of the shrinking method is fixing, in the drying step, the birefringent film which includes the remaining solvent to a metal frame and drying it by heat.

Next, materials used in the manufacturing method of the present invention, such as a polymer, a base, a solvent and the like, will be described. The polymer material is not particularly limited as long as it contains polyimide. The polyimide is advantageous because it has a main chain with excellent rigidity, linearity and symmetric property, and can realize a large birefringence in its thickness direction. The polyimide can be used solely, in combination of two kinds or more, or in combination with a polymer other than the polyimide. The polymer may be a mixture or a copolymer of monomers, and a blend ratio or a copolymerization ratio is not particularly limited. Examples of the polymer other than the polyimide include polyamide, polyester, polyetherketone, polyamide-imide, polyesterimide and the like. Molecular weights of these polymer materials are not particularly limited, but an average molecular weight thereof preferably ranges, for example, from 1,000 to 1,000,000, and more preferably ranges from 2,000 to 500,000. When the average molecular weight is in that range, a sufficient strength can be obtained, therefore, the polymer can be processed into a film in which cracks due to shrinkage, distortion or the like will rarely occur. In addition, the polymer materials will not be gelled, and thus the solubility in a solvent can be improved.

The polyimide may be a polyimide having a high in-plane alignment and being soluble in organic solvents. Examples include polyimide described in U.S. Pat. Nos. 5,071,997, 5,480,964, JP8(1996)-511812, JP10(1998)-508048, JP2000-511296A and the like. Specific examples include polyimide having the repeating unit represented by the following structural formula (1).

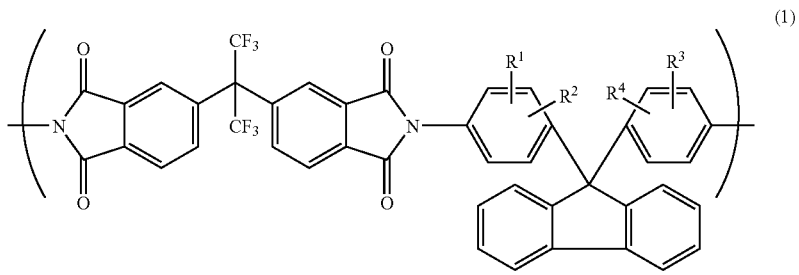

(1)

In the above structural formula (1), $R^1$ to $R^4$ may be the same or different, and may be selected from the group consisting of hydrogen, halogen, a phenyl group, a phenyl group substituted with 1 to 4 halogen atoms or a $C_{1-10}$ alkyl group, and a $C_{1-10}$ alkyl group.

In the repeating unit represented by the structural formula (1), it is preferable that the $R^1$ and the $R^3$ are methyl groups and the $R^2$ and the $R^4$ are hydrogen, and specific examples include the repeating unit represented by the structural formula (2) below.

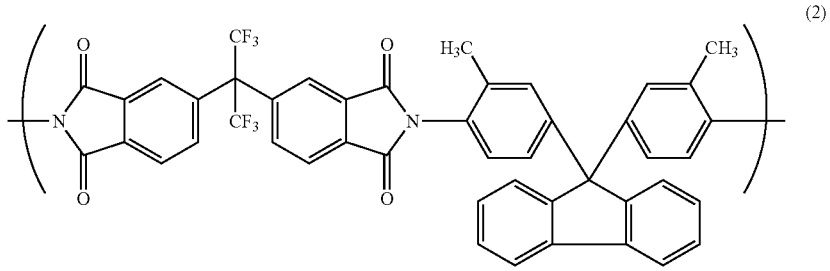

(2)

As the polyimide used in the manufacturing method of the present invention, it is preferable to use, for example, a condensation polymer of 9,9-bis(aminoaryl)fluorene and an aromatic tetracarboxylic dianhydride disclosed in JP 2000-511296 A, more specifically, a polymer containing at least one repeating unit represented by the structural formula (3) below.

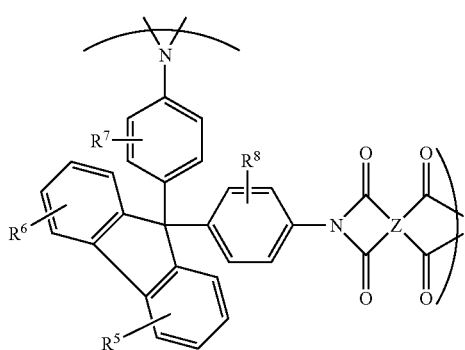

(3)

In the above formula (3), $R^5$ to $R^8$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^5$ to $R^8$ are at least one substituent selected independently from the group consisting of halogen, a phenyl group, a phenyl group substituted with 1 to 4 halogen atoms or a $C_{1-10}$ alkyl group, and a $C_{1-10}$ alkyl group. In addition, Z is, for example, a $C_{6-20}$ quadrivalent aromatic group, and preferably is a pyromellitic group, a polycyclic aromatic group, a derivative of a polycyclic aromatic group or a group represented by the formula (4) below.

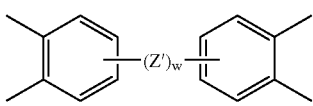

(4)

In the formula (4) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

As other polyimide used in the manufacturing method of the present invention, for example, homopolymer whose repeating unit is represented by the general formula (5) or (6) below or polyimide whose repeating unit is represented by the structural formula (7) below disclosed in JP 8(1996)-511812 A may be used. The polyimide represented by the structural formula (7) below is a preferable mode of the homopolymer represented by the formula (5).

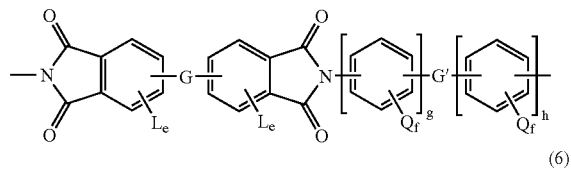

(5)

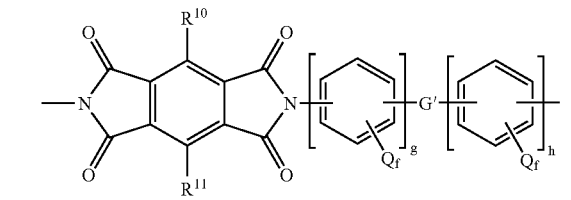

(6)

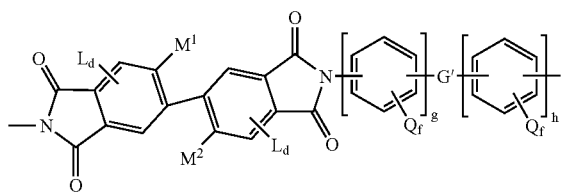

(7)

In the above general formulae (5) to (7), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (5) and (7), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (5) to (7), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are 1 or more.

In the above formula (6), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (7), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (5) includes polyimide represented by the formula (8) below.

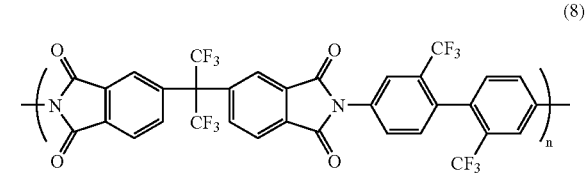

(8)

Still other polyimide used in the manufacturing method of the present invention may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl)ether dianhydride, 4,4'-oxydiphthalic dianhydride, bis(3,4- dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenylmethane, 4,4'-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diaminodiphenylether, 3,4'-diaminodiphenylether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diaminodiphenylthioether or 4,4'-diaminodiphenylsulfone.

The polyetherketone as a material used in the manufacturing method of the present invention may be, for example, polyaryletherketone represented by the general formula (9) below, which is disclosed in JP 2001-49110 A.

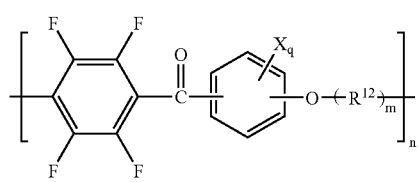

(9)

In the above formula (9), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-6}$ lower branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above general formula (9), q is an integer from 0 to 4. In the formula (9), it is preferable that q=0 and a carbonyl group and an oxygen atom of an ether that are bonded to both ends of a benzene ring are present at para positions. Also, in the above general formula (9), $R^{12}$ is a group represented by the formula (10) below, and m is an integer of 0 or 1.

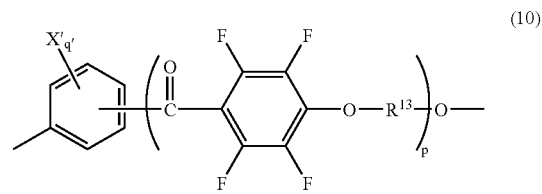

(10)

In the above structural formula (10), X' is a substituent and is the same as X in the formula (9), for example. In the structural formula (10), when there are plural X's, they may be the same or different. q' indicates the number of substitutions in the X' and is an integer from 0 to 4, preferably, q'=0. In addition, p is an integer of 0 or 1.

In the formula (10), $R^{13}$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenylether or biphenylsulfone. In these divalent aromatic groups, hydrogen that is bonded directly to the aromatic may be substituted with a halogen atom, a lower alkyl group or a lower alkoxy group. Among them, the $R^{13}$ preferably is an aromatic group selected from the group consisting of the formulae (11) to (17) below.

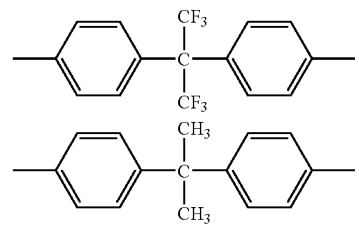

(11)

(13)

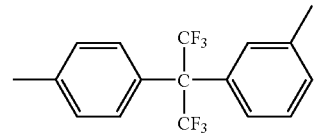

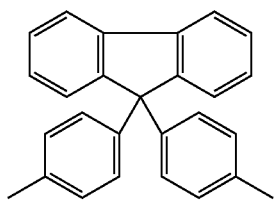
(14)

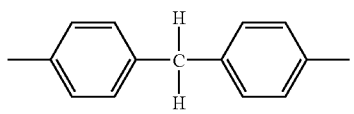
(15)

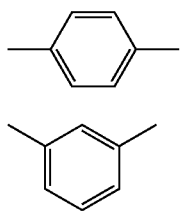
(16)

(17)

In the above formula (9), the $R^{12}$ preferably is a group represented by the formula (18) below, wherein $R^{13}$ and p are equivalent to those in the above-noted formula (10).

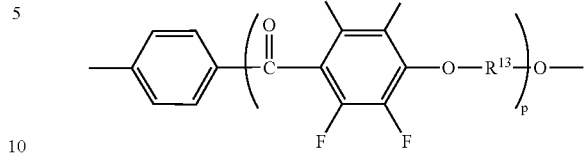
(18)

Furthermore, in the formula (9), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (9) is fluorine and an end on an oxyalkylene group side thereof is a hydrogen atom. Such a polyaryletherketone can be represented by the general formula (19) below. In the formula below, n indicates a degree of polymerization as in the general formula (9).

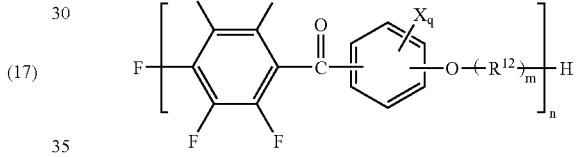
(19)

Specific examples of the polyaryletherketone represented by the formula (9) may include those represented by the formulae (20) to (23) below, wherein n indicates a degree of polymerization as in the formula (9).

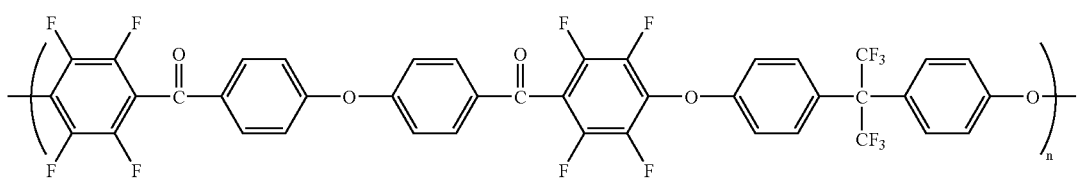
(20)

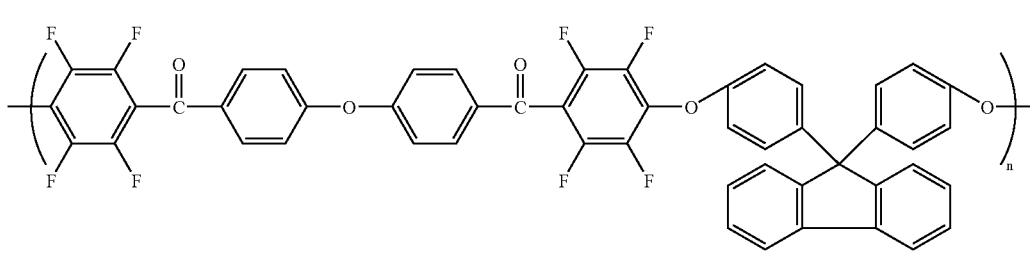
(21)

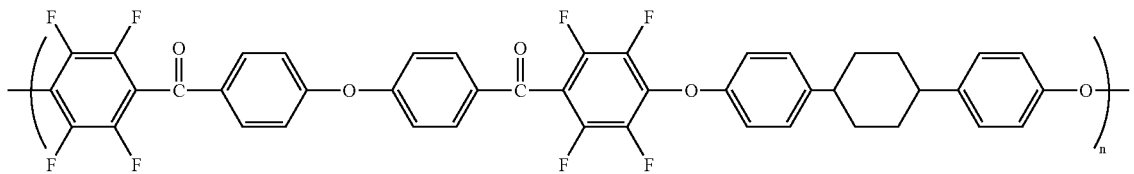

(22)

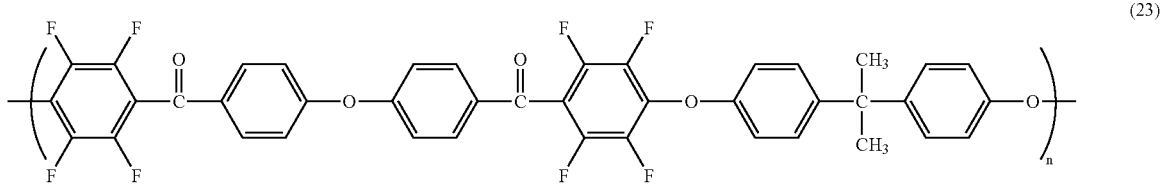

(23)

The polyamide or polyester as a material used in the manufacturing method of the present invention may be, for example, polyamide or polyester described in JP 10(1998)-508048 A, and their repeating units can be represented by the general formula (24) below.

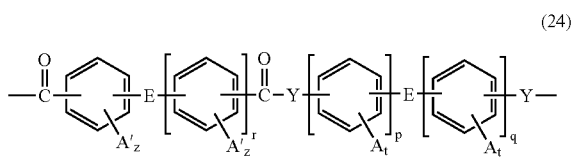

(24)

In the above formula (24), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (24), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the structural formula (24) above, the repeating unit represented by the structural formula (25) below is preferable.

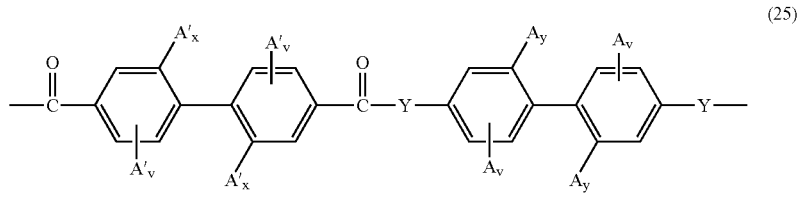

(25)

In the formula (25), A, A' and Y are those defined by the formula (24), and v is an integer from 0 to 3, preferably is an integer from 0 to 2. Although each of x and y is 0 or 1, not both of them are 0.

Moreover, resins with other structures further may be blended into the polymer material as long as the alignment of the material does not drop considerably. The resins to be blended can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

Further, other than the above, liquid crystal polymers or the like can be used for the resin to be blended. Particularly, in the case where the blended materials are compatible with each other and show a liquid crystallinity, there is an expectation that an alignment is also controlled by a magnetic field, an electric field, an alignment film, a stretching alignment, a flowing alignment or the like. Further, in the case where the resin blended is a material containing a photoreactive functional group that can photoisomerize or photodimerize, a three-dimensional molecular alignment can be controlled by irradiation with light. When these materials are blended into the polymer material, a blending amount thereof is not particularly limited as far as the alignment thereof does not drop considerably, but generally it ranges, for example, from 0 to 50 wt %, and preferably ranges from 0 to 30 wt % with respect to the polymer material.

Solvent of a polymer solution used in the manufacturing method of the present invention is not particularly limited as long as it can dissolve the polymer material and the like, and can be determined according to the kind of the polymer material. Examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methylethylketone, methylisobutylketone, cyclohexanone, cyclopentanone, 2-pyrrolidone and N-methyl-2-pyrrolidone; ester-based solvents such as ethyl acetate and butyl acetate; alcohol-based solvents such as tert-butyl alcohol, glycerin, ethylene glycol, triethylene glycol, ethylene glycol monomethylether, diethylene glycol dimethylether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethylether, dibutylether and tetrahydrofuran; or carbon disulfide, ethyl cellosolve or butyl cellosolve. These solvents may be used alone or in combination of two or more. Among them, the solvent used in the manufacturing method of the present invention is preferably dimethylacetamide, dimethylformamide, N-methyl-2-pyrrolidone, dichloromethane, trichloroethylene, tetrachloroethane, cyclohexanone, cyclopentanone, methylethylketone, methylisobutylketone, diethylene glycol dimethylether, toluene, ethyl acetate or tetrahydrofuran, more preferably, methylisobutylketone, cyclopentanone or ethyl acetate, and particularly preferably methylisobutylketone.

In the polymer solution, various additives including, for example, an ultraviolet absorber, a stabilizer, a plasticizer, a metal, an antistatic agent, an additive that serves arbitrary purposes, for example, obtaining an adhering property with the base or the like may be blended as necessary as long as optical characteristics of the obtained optical film do not deteriorate.

There is no particular limitation about the base on which the polymer solution in the manufacturing method of the present invention is applied, but for example, a plastic base or a base of an inorganic compound such as a glass substrate and a silicon wafer can be used. The plastic base may be manufactured by a cast method, a method of forming a film of a molten polymer and stretching the film, or the like. Among them, the plastic base stretched to increase the mechanical strength is preferable, because a high coating precision is obtainable.

In addition, the base is preferably, for example, a transparent film formed of a polymer with excellent transparency. If using such a base, a laminate prepared by forming a birefringent film on the base can be used directly as an optical film. Also, when a optical film manufactured by the method of the present invention functions as a complex with a retardation plate, optical characteristics of a liquid crystal display panel can be designed more precisely for widening a viewing angle thereof. Therefore, for example, the base is preferably a retardation plate generating a retardation when stretched. More specifically, for example, a preferable base can control wavelength dispersion of a refractive index, an angle of a lagging axis and the like.

Examples of a material for such a base include an acetate resin such as cellulose triacetate (TAC), resins based on polyester, polyethersulfone, polysulfone, polycarbonate, polyamide, polyimide, polyolefin, acryl, polynorbornene, cellulose, polyalylate, polystyrene, polyvinyl alcohol, polyvinyl chloride, polyvinylidene chloride, polyacryl, and a mixture thereof. In addition, liquid crystal polymers and the like also can be used. Another example of the base material is described in JP 2001-343529A (WO 01/37007). The material is a resin composition containing a thermoplastic resin whose side chain has a substituted or unsubstituted imido group and a thermoplastic resin whose side chain has a substituted or unsubstituted phenyl group and nitrile group, more specifically, a resin composition containing an alternating copolymer of isobutene and N-methylmaleimide and an acrylonitrile-styrene copolymer. Among them, preferable bases are, for example, commercially available products (e.g., trade name: ARTON manufactured by JSR Corporation, and trade name: ZEONOR manufactured by ZEON Corporation), the resin compound including the alternating copolymer of isobutene and N-methylmaleimide and an acrylonitrile-styrene copolymer, and the like. Alternatively, the base may be a polarizer, a transparent protective layer or a polarizing plate, as described below. The base may be subjected to an appropriate treatment on its surfaces, for arbitrary purposes such as improving adherence to polyimide, preventing occurrence of cracks therein, which is caused by penetration of a solvent, or the like.

A thickness of the base ranges, for example, from 12 to 200 μm, inclusive, preferably ranges from 20 to 150 μm, inclusive, more preferably ranges from 25 to 100 μm, inclusive. When the thickness is 12 μm or more, a sufficient precision of coating can be obtained, and when the thickness is 200 μm or less, the amount of distortion can be better suppressed in the case where the base is mounted on a liquid crystal panel, thus preventing an appearance disorder.

The optical film of the present invention may include the birefringent film obtained by the manufacturing method of the present invention, and other configurations and structures are not particularly limited. The birefringent film may have either an optically negative uniaxiality (nx=ny>nz) or an optically negative biaxiality (nx>ny>nz).

When the birefringent film has an optical biaxiality, the below-described conditions (I) and (II) are preferably satisfied. Here, nx, ny and nz are as mentioned above.

$$0.01 < nx-nz < 0.12 \tag{I}$$

$$3 < (nx-nz)/(nx-ny) < 100 \tag{II}$$

When the value of (nx−nz)/(nx−ny) in the above condition (II) is larger than 3, in the case where the optical film with an optical biaxiality of the present invention is used for a liquid crystal display apparatus or the like, a sufficient contrast ratio can be obtained, and when the value is smaller than 100, an excellent viewing angle property can be obtained. In the above-noted range, the value of (nx−nz)/(nx−ny) is preferably larger than 3 and smaller than 60, more preferably larger than 3 and smaller than 30, and further preferably larger than 3 and smaller than 6. Moreover, for example, in the case where a liquid crystal cell of the liquid crystal display is in a VA mode, the value of (nx−nz)/(nx−ny) is particularly preferably larger than 3 and smaller than 6.

Furthermore, in the present invention, the birefringent film with an optical biaxiality preferably have a relatively large birefringent index ΔNxz in a thickness direction, which is determined by ΔNxz=nx−nz being 0.002 or larger, for example. When the ΔNxz is 0.002 or larger, it is not necessary to increase the film thickness as conventionally so as to obtain a retardation value in the thickness direction, nor further laminate with another retardation film thereon, thus thickness is reduced. The ΔNxz is preferably 0.005 or larger, more preferably 0.01 or larger, and further preferably 0.02 or larger.

In the birefringent film with an optical biaxiality, a retardation value Rth in the thickness direction and an in-plane retardation value Δnd can be determined respectively by the following formulae (IV) and (V), where a letter of d denotes the thickness of the birefringent film.

$$Rth=(nx-nz)\times d \tag{IV}$$

$$\Delta nd=(nx-ny)\times d \tag{V}$$

The retardation value Rth in the thickness direction ranges, for example, from 50 to 1000 nm, inclusive. The Rth of 50 nm or larger allows the optical film to function as an optical element sufficiently, and the Rth of 1000 nm or smaller suppresses occurrence of irregularity while coating with a polymer used or drying it, whereby a birefringent film with an excellent uniformity can be obtained. The Rth preferably ranges from 100 to 600 nm, inclusive, and more preferably ranges from 200 to 400 nm, inclusive. The in-plane retardation value Δnd ranges, for example, from 10 to 990 nm, inclusive, and preferably ranges from 20 to 390 nm, inclusive, because the in-plane retardation value Δnd in these ranges can improve effectively a viewing angle property of the liquid crystal display.

The thickness of the birefringent film of the present invention is not particularly limited, but preferably ranges from 0.2 to 100 μm, more preferably ranges from 0.5 to 50 μm, and particularly preferably ranges from 1 to 20 μm, so that the birefringent film may serve to reduce a thickness of the liquid crystal display, and it may have an excellent viewing angle compensation function and an uniform retardation.

The optical film of the present invention has excellent optical transparency, heat resistance, flexibility, moisture resistance, mechanical strength, stability of optical characteristics and the like, since the amount of a remaining solvent of the birefringent film can be reduced by, for example, the manufacturing method of the present invention. Specifically, in the case of heating the optical film of the present invention at 100° C. for 24 hours using an oven, a change of the retardation value Rth in the thickness direction of the birefringent film of the optical film, for example, within 5 nm before and after the heating. The change of the retardation value is preferably 4 nm or less, and more preferably 3 nm or less.

Since the optical film of the present invention is an optical member that can be used in, for example, an image display apparatus or the like, it is preferably colorless and transparent. A transmittance of the optical film is, for example, preferably 90% or more, more preferably 91% or more, and further preferably 92% or more with respect to light with wavelength of 590 nm. These values may include surface reflections on a surface and a rear face of the optical film. In order to obtain the transparency of the optical film, it is preferable to set purities of the polymers and the solvents used and the like appropriately, as well as employ the manufacturing method of the present invention.

The birefringent film formed on the base according to the manufacturing method of the present invention can be used for the optical film of the present invention, in a state either as a laminate with the base or as a single layer peeled off from the base. Furthermore, the optical film may be used, while being laminated with another base or the like via an adhesive layer or a pressure-sensitive adhesive layer. The adhesive layer or the pressure-sensitive adhesive layer is not particularly limited, but for example, polymer pressure-sensitive adhesives based on acryl, vinyl alcohol, silicon, polyester, polyurethane, polyether and the like, rubber-based pressure-sensitive adhesive and the like can be used. Fine particles may be blended in these materials so as to allow the adhesive layer or the like to diffuse light. Among them, the adhesive or the pressure-sensitive adhesive is preferably a material having, for example, excellent moisture resistance and heat resistance. For example, if the adhesive or the pressure-sensitive adhesive having such properties is used for a liquid crystal display apparatus, foaming and exfoliation due to moisture absorption, deterioration of optical characteristics and warps of liquid crystal cells due to a thermal expansion coefficient difference and the like can be prevented, whereby a display apparatus with high quality and excellent durability can be obtained.

It is preferable that the optical film of the present invention is further provided with the adhesive layer or the pressure-sensitive adhesive layer on at least one surface thereof. In that case, adhesion of the optical film of the present invention to other members such an optical layer, a liquid crystal cell and the like can be easier, and the exfoliation of the optical film of the present invention can be prevented.

The laminated polarizing plate of the present invention includes an optical film, which is the optical film of the present invention. A configuration of the laminated polarizing plate is not particularly limited as long as it includes the optical film of the present invention. The polarizing plate to be laminated with the optical film of the present invention may be, for example, a polarizer alone, or a polarizer with a transparent protective layer laminated on one or both sides thereof.

Embodiments of the laminated polarizing plate of the present invention using a birefringent film with an optical biaxiality may be, for example, the configurations illustrated by the cross sectional views of FIGS. 1A to 1D. These figures illustrate a state where the laminated polarizing plate is disposed on a liquid crystal cell, assigning the same parts with the same reference numerals. Here, the laminated polarizing plate of the present invention is not limited to the following structure, and further can include another optical member or the like. Alternatively, in the case of using a birefringent film with a uniaxiality, the laminated polarizing plate of the present invention can have the same structure.

The laminated polarizing plate 10 illustrated in FIG. 1A includes a birefringent film 1 with an optical biaxiality, a base 2, two pressure-sensitive adhesive layers 3, a polarizer 4, and two transparent protective layers 5. The birefringent film 1 is laminated on one surface of the base 2, one of the pressure-sensitive adhesive layers 3 is further formed on a surface of the birefringent film 1, and the polarizer 4 with the transparent protective layers 5 laminated on both surfaces thereof is disposed on the other surface of the base 2 via the other pressure-sensitive adhesive layer 3. Further, the laminated polarizing plate 10 is adhered to a liquid crystal cell 6 by the pressure-sensitive adhesive layer 3 disposed as an outermost layer of the laminated polarizing plate 10. Here, the pressure-sensitive adhesive layer 3 may be an adhesive layer, which is also applicable hereinafter. In the laminated polarizing plate 10, the birefringent film 1 with an optical biaxiality is used as a laminate, being formed directly on the base 2 as mentioned above.

Figure 1B:
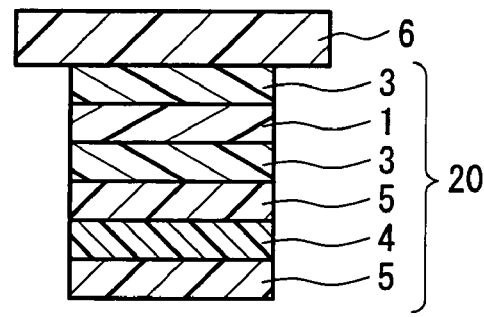

A laminated polarizing plate 20 illustrated in FIG. 1B includes a birefringent film 1 with an optical biaxiality, two pressure-sensitive adhesive layers 3, a polarizer 4, and two transparent protective layers 5. The pressure-sensitive adhesive layers 3 are formed on both surfaces of the birefringent film 1, the polarizer 4 with the transparent protective layers 5 laminated on both surfaces thereof is disposed on one of the pressure-sensitive adhesive layers 3. Further, the laminated polarizing plate 20 is adhered to a liquid crystal cell 6 by the other pressure-sensitive adhesive layer 3 that is disposed as an outermost layer of the laminated polarizing plate 20. In the laminated polarizing plate 20, the birefringent film 1 with an optical biaxiality, which is peeled off from the base, is used.

Figure 1C:
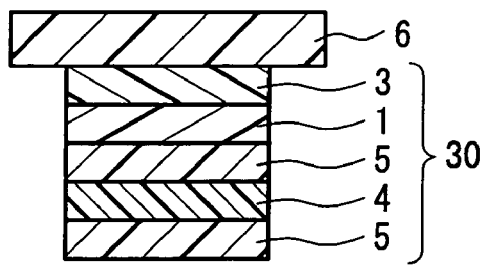

A laminated polarizing plate 30 illustrated in FIG. 1C includes a birefringent film 1 with an optical biaxiality, a pressure-sensitive adhesive layer 3, a polarizer 4, and two transparent protective layers 5. The pressure-sensitive adhesive layer 3 is formed on one surface of the birefringent film 1, and the polarizer 4 with the transparent protective layers 5 laminated on both surfaces thereof is disposed on the other surface of the birefringent film 1. Further, the laminated polarizing plate 30 is adhered to a liquid crystal cell 6 by the pressure-sensitive adhesive layer 3 disposed as an outermost layer of the laminated polarizing plate 30. In the laminated polarizing plate 30, the birefringent film 1 with an optical biaxiality is formed directly on a base, which is one of the transparent protective layers 5 disposed on the polarizer 4.

Figure 1D:
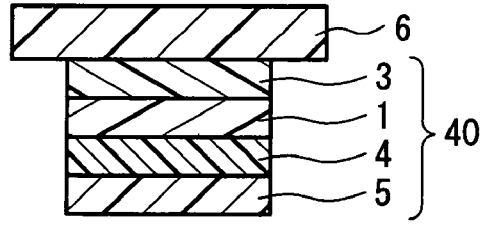

A laminated polarizing plate 40 illustrated in FIG. 1D includes a birefringent film 1 with an optical biaxiality, a pressure-sensitive adhesive layer 3, a polarizer 4, and a transparent protective layer 5. The pressure-sensitive adhesive layer 3 is formed on one surface of the birefringent film 1, the polarizer 4 is laminated on the other surface of the birefringent film 1, and the transparent protective layers 5 is further laminated on a surface of the polarizer 4. Further, the laminated polarizing plate 40 is adhered to a liquid crystal cell 6 by the pressure-sensitive adhesive layer 3 disposed as an outermost layer of the laminated polarizing plate 40. In the laminated polarizing plate 40, the birefringent film 1 functions also as a transparent protective layer on the polarizer 4, thereby reducing a thickness of the laminated polarizing plate 40.

The polarizer is not particularly limited, but can be a film, for example, prepared by being dyed by adsorbing a dichroic material such as iodine or a dichroic dye, followed by cross-linking, stretching and drying. Among them, films that can penetrate linearly polarized light when natural light is entered, more specifically, films having excellent light transmittance and polarization degree are preferable. Examples of the polymer film in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, a polyene alignment film such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The transparent protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as cellulose triacetate (TAC), and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Another example of the transparent protective layer is a polymer described in JP 2001-343529 A (WO 01/37007). The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methylmaleimide and an acrylonitrile-styrene copolymer. Alternatively, the polymer film may be formed by extruding the resin composition.

It is preferable that the transparent protective layer is colorless. More specifically, a retardation value (Rth') of the film in its thickness direction as represented by the condition below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the transparent film, can be solved sufficiently. In the equation below, nx, ny and nz are birefringent indices in the transparent protective layer, which are the same as those described above, and d indicates the thickness of this film.

$$Rth'=\{[(nx+ny)/2]-nz\} \times d$$

The transparent protective layer may further have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various films obtained by stretching the above-described transparent resins uniaxially or biaxially, an alignment film of a liquid crystal polymer or the like, and a laminate obtained by providing an aligned layer of a liquid crystal polymer on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-aligned layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the optical retardation film and a film support of triacetylcellulose film or the like so as to control optical characteristics such as retardation.

The thickness of the transparent protective layer is not particularly limited but can be determined suitably according to retardation or a protection strength. In general, the thickness is not greater than 500 µM, preferably ranges from 5 to 300 µm, and more preferably ranges from 5 to 150 µm.

The transparent protective layer can be formed suitably by a known method such as a method of coating the polarizer with the above-mentioned various transparent resins or a method of laminating the transparent resin film, the optically compensating retardation plate or the like on the polarizer, or can be a commercially available product.

The transparent protective layer may be further subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a known method. The anti-sticking treatment aims to prevent adjacent layers from sticking to each other. The antireflection treatment aims to prevent reflection of external light on the surface of the polarizing plate, and can be carried out by forming a known antireflection film or the like.

The anti-glare treatment aims to prevent hindering visibility of light transmitted through the polarizing plate due to the reflection of external light on the polarizing plate surface. The anti-glare treatment can be carried out, for example, by providing microscopic asperities on a surface of a transparent protective film by a known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 µm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as an sheet of optical layers comprising these layers, separately from the transparent protective layer.

Method for laminating each members (an optical film, a polarizer, a transparent protective layer, etc) is not particularly limited and can be a conventional method. Generally, the above-mentioned adhesive and pressure-sensitive adhesive can be used, and the kind thereof can be determined suitably depending on materials of the birefringent layer and the polarizing plate. The adhesive can be, for example, a polymer adhesive based on acrylic substances, vinyl alcohol, silicone, polyester, polyurethane or polyether, or a rubber-based adhesive. It also is possible to use an adhesive or rubber adhesive containing a water-soluble cross-linking agent of vinyl alcohol-based polymers such as glutaraldehyde, melamine and oxalic acid. The pressure-sensitive adhesive and the adhesive mentioned above do not peel off easily even when being exposed to moisture or heat, for example, and have excellent light transmittance and polarization degree. More specifically, these pressure-sensitive adhesive and adhesive preferably are PVA-based adhesives when the polarizing plate is a PVA-based film, in light of stability of adhering treatment. These pressure-sensitive adhesive and adhesive may be applied directly to surfaces of the polarizing plate and the transparent protective layer, or a layer of a tape or a sheet formed of the pressure-sensitive adhesive or adhesive may be arranged on the surfaces thereof. Further, when these pressure-sensitive adhesive and adhesive are prepared as an aqueous solution, for example, other additives or a catalyst such as an acid catalyst may be blended as necessary. In the case of applying the adhesive, other additives or a catalyst such as an acid catalyst further may be blended in the aqueous solution of the adhesive. The thickness of the adhesive layer is not particularly limited but may be, for example, 1 to 500 nm, preferably 10 to 300 nm, and more preferably 20 to 100 nm.

The optical film of the present invention can be used in combination with, for example, various retardation plates, diffusion-control films, and brightness-enhancement films. The retardation film can be prepared by, for example, stretching a polymer film uniaxially or biaxially, subjecting a polymer film to Z-axis alignment, or coating a liquid crystal polymer on a base. When the optical film of the present invention is combined with the coating film of the liquid crystal polymer, the optical film also can function as an alignment film. In this case, the optical film may be, or may not be subjected to an alignment additionally. The alignment may be provided by, for example, a rubbing treatment, irradiation with a polarized ultraviolet ray or the like. The diffusion-control films can use diffusion, scattering, and refraction for controlling viewing angles, or for controlling glaring and scattered light that will affect definition. The brightness-enhancement film may include a $\lambda/4$ wavelength plate (a $\lambda/4$ plate) and a selective reflector of a cholesteric liquid crystal, and a scattering film using an anisotropic scatter depending on the polarization direction. The optical film can be, for example, combined with a wire grid polarizer. The brightness-enhancement film may be, for example, a commercially available product (trade name: D-BEF, manufactured by 3M Co.) or the like.

In use, the laminated polarizing plate of the present invention can further contain other optical layers in addition to the optical films of the present invention. Examples of the optical layers include conventionally known optical layers used for forming liquid crystal displays or the like, such as below-mentioned polarizing plates, reflectors, semitransparent reflectors, and brightness-enhancement films. These optical layers can be used alone, or at least two kinds of layers can be used together. A laminated polarizing plate further including the optical layer is used preferably as an integrated polarizing plate having an optical compensation function, and for example, it is suitably applied to various image displays, for example, by being arranged on a surface of a liquid crystal cell.

The integrated polarizing plate will be described below in detail.

First, an example of a reflective polarizing plate or a semitransparent reflective polarizing plate is described. The reflective polarizing plate is prepared by laminating a reflector additionally on the laminated polarizing plates of the present invention, and a semitransparent reflective polarizing plate is prepared by laminating a semitransparent reflector additionally on the laminated polarizing plates of the present invention.

In general, the reflective polarizing plate is arranged on a backside of a liquid crystal cell in order to make a liquid crystal display to reflect incident light from a visible side (display side) of a reflective type liquid crystal display. The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of the polarizing plate that exhibits an elastic modulus. More specifically, for example, a transparent protective layer of the polarizing plate is prepared by matting one surface (surface to be exposed) as required. On this surface, a foil comprising a reflective metal such as aluminum or a deposition film is applied to form a reflector.

An additional example of a reflective polarizing plate includes the transparent protective layer that has a surface with microscopic asperities formed by blending fine particles in transparent resins as described above. The reflective polarizing plate also includes a reflecting layer corresponding to the microscopic asperities. The reflecting layer having a microscopic asperity surface diffuses incident light irregularly so that directivity and glare can be prevented and irregularity in color tones can be controlled. The reflector can be formed as the foil or the deposition film comprising a metal, by attaching a metal directly on a surface of the transparent protective layer with microscopic asperities in any conventional and appropriate methods including deposition such as vacuum deposition, and plating such as ion plating and sputtering.

The above-mentioned reflective polarizing plate is manufactured by directly forming the reflector on a transparent protective layer of the polarizing plate. Alternatively, the reflector can be used as a reflecting sheet formed by providing a reflecting layer onto a proper film similar to the transparent protective film. Since a typical reflecting layer of a reflector is made of a metal, it is preferably used in a state coated with the film, a polarizing plate or the like in order to prevent a reduction of the reflection rate due to oxidation to maintain the initial reflection rate for a long period, and to prevent formation of an additional transparent protective film.

The semitransparent polarizing plate is provided by replacing the reflector in the above-mentioned reflective polarizing plate by a transflector, and it is exemplified by a half mirror that reflects and transmits light at the reflector.

In general, such a semitransparent polarizing plate is arranged on a backside of a liquid crystal cell, and can be used for the following: a liquid crystal display comprising the semitransparent polarizing plate, wherein incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

Next, an example of a polarizing plate comprising a brightness-enhancement film further laminated on a laminated polarizing plate of the present invention will be described.

The brightness-enhancement film is not particularly limited, but a suitable example of the brightness-enhancement film is selected from a multilayer thin film of a dielectric or a multilayer lamination of thin films with varied refraction aeolotropy (e.g., trade name: D-BEF manufactured by 3M Co.) that transmits linearly polarized light having a predetermined polarization axis while reflecting other light, and a cholesteric liquid crystal layer, more specifically, an alignment film of a cholesteric liquid crystal polymer or an aligned liquid crystal layer fixed onto a supportive substrate (e.g., trade name: PCF 350 manufactured by Nitto Denko Corporation, or trade name: Transmax manufactured by Merck and Co., Inc.) that reflects either clockwise or counterclockwise circularly polarized light while transmitting other light.

Above stated polarizing plate of the present invention may be an optical member including, for example, a laminated polarizing plate of the present invention and at least two optical layers laminated further thereon.

An optical member comprising a laminate of at least two optical layers can be formed by a method of laminating layers separately in a certain order for manufacturing a liquid crystal display or the like. Since an optical member that has been laminated previously has excellent stability in quality and assembling operability, efficiency in manufacturing a liquid crystal display can be improved. Any appropriate adhesives such as a pressure-sensitive adhesive layer can be used for the lamination.

It is preferable that the above-described various polarizing plates further include pressure-sensitive adhesive layers and adhesive layers, so that lamination of the polarizing plates onto the other member such as a liquid crystal cell will be facilitated. The pressure-sensitive adhesive layers and adhesive layers can be arranged on one or both surface of the polarizing plates. Materials of the pressure-sensitive adhesive layers are not particularly limited, and conventionally known materials such as acrylic polymers can be used. More specifically, materials for the pressure-sensitive adhesive layer are particularly preferred to have low moisture absorption and excellent heat resistance, in order to prevent foaming and exfoliation caused by moisture absorption, and optical characteristics deterioration and warp of a liquid crystal cell caused by the thermal expansion difference, accordingly to manufacture a liquid crystal display with high quality and excellent durability. The pressure-sensitive adhesive layer may contain fine particles for diffusing light. The pressure-sensitive adhesive layer can be formed on the surface of the polarizing plate, for example, by adding the solution or molten liquid of various sticking materials directly on a predetermined face of the polarizing plate by the expanding method such as flow-expanding and coating. The pressure-sensitive adhesive layer on the surface of the polarizing plate may be obtained also by forming a pressure-sensitive adhesive layer on a below-mentioned separator in the same manner as described above, subsequently removing and fixing it onto a predetermined surface of the polarizing plate. Here, the pressure-sensitive adhesive layer can be formed on any surface of the polarizing plate. Specifically for example, it can be formed on the exposed surface of the retardation plate in the polarizing plate.

When a surface of a pressure-sensitive adhesive layer on a surface of the polarizing plate is exposed, the pressure-sensitive adhesive layer is preferably covered with a separator until the time the pressure-sensitive adhesive layer is used so that contamination will be prevented. The separator can be formed by coating, on an appropriate film such as the transparent protective film, a layer including at least one layer of a peeling agent containing silicone, long-chain alkyl, fluorine, molybdenum sulfide or the like as required.

The pressure-sensitive adhesive layer or the like may be, for example, a single layer or a laminate. For the laminate, for example, layers different from each other in the compositions and in the types can be combined. In a case of arranging on both surfaces of the polarizing plate, the pressure-sensitive layers can be the same or can be different from each other in the compositions and the types. The thickness of the pressure-sensitive adhesive layer can be determined according to the configuration of the polarizing plate or the like, and generally, it ranges from 1 to 500 μm.

The pressure-sensitive adhesive forming the pressure-sensitive adhesive layer has excellent optical transparency and sticking properties including appropriate wettability, cohesiveness, and stickiness. For example, pressure-sensitive adhesive can be prepared by processing a polymer such as an acrylic polymer, a silicone-based polymer, polyester, polyurethane, polyether and polymers based on a synthetic rubber, as a base polymer, as required. The sticking property of the pressure-sensitive adhesive layer can be controlled by a conventionally known method, for example, by controlling the cross-linking degree and molecular weight depending on the composition, the molecular weight, the cross-linking form, the content of the cross-linking functional group and the rate for blending the cross-linking agent for the base polymer forming the pressure-sensitive adhesive layer.

The above-described layers of the present invention, such as an optical film, a laminated polarizing plate, polarizing films for forming various optical members (various polarizing plates prepared by laminating optical layers), a transparent protective layer, an optical layer, and a pressure-sensitive adhesive layer can have ultraviolet absorption power as a result of treatment with an ultraviolet absorber such as an salicylate compound, a benzophene-based compound, a benzotriazole compound, a cyanoacrylate compound, and a nickel complex salt compound.

As mentioned above, an optical film and a laminated polarizing plate of the present invention is preferably used for manufacturing various devices such as liquid crystal displays. For example, they are arranged on one or both surfaces of a liquid crystal cell to form a liquid crystal panel so as to provide various types of liquid crystal displays such as reflective, semitransparent, transparent-reflective liquid crystal displays or the like.

The liquid crystal panel of the present invention includes a liquid crystal cell and optical members, wherein the optical members are arranged at least one surface of the liquid crystal cell. The liquid crystal cell is not particularly limited except that the optical members are optical films or laminating polarizing plates of the present invention.

The kind of the liquid crystal cell forming a liquid crystal panel of the present invention may be selected arbitrarily, and can be any type of liquid crystal cells such as an active-matrix driving type represented by a thin-film transistor type, or a simple-matrix driving type represented by a twisted nematic type or a super twisted nematic type. Among them, since the optical film and the laminated polarizing plate of the present invention are particularly excellent in the optical compensation for a VA (vertically aligned) cell, they are suitably used for viewing angle compensating films for VA-mode liquid crystal displays.

Generally, the liquid crystal cell has a configuration that liquid crystal is injected between liquid crystal cell substrates that are arranged facing each other. The liquid crystal cell substrate is not particularly limited, and the examples include a glass substrate and a plastic substrate. Moreover, materials of the plastic substrate are not limited specifically, and conventionally known materials can be used.

When polarizing plates or optical members are arranged on both surfaces of a liquid crystal panel, the kinds of polarizing plates or the optical members on the surfaces can be the same or different. Moreover, for forming a liquid crystal display, an appropriate member such as a prism array sheet, a lens array sheet, an optical diffuser and a backlight can be arranged by one or plural layer(s) at proper positions as required.

Furthermore, a liquid crystal display of the present invention includes a liquid crystal panel, and the liquid crystal panel is not limited particularly except that the liquid crystal panel of the present invention is used. When the liquid crystal display includes a light source, the light source is not particularly limited, but a flat light source emitting polarized light is preferred since it enables effective use of light energy.

In the liquid crystal display of the present invention, a diffusion plate, an anti-glare layer, an antireflection film, a protective layer or a protective plate further may be disposed on the optical film (a polarizing plate) on the viewing side. Alternatively, a retardation plate for compensation or the like can be arranged between a liquid crystal cell and a polarizing plate in a liquid crystal panel, as required.

An optical film and a laminated polarizing plate of the present invention can be used not only in the above-described liquid crystal display but also in, for example, self-light-emitting displays such as an organic electroluminescence (EL) display, a PDP, and a FED. The configurations of these apparatuses are not limited except a point that the optical films of the present invention or the like are used instead of conventional optical films and laminated polarizing plates. When using the optical film and the laminated polarizing plate of the present invention as antireflective filters in self-light-emitting flat displays, circularly polarized light can be obtained, for example, by setting an in-plane retardation value ($\Delta$nd) of the optical film of the present invention to be $\lambda/4$.

Next, the method for manufacturing the birefringent film of the present invention will be described below further in detail, using Examples and Comparative examples, though the present invention is not limited to them.

EXAMPLE 1

Method for Measuring Optical Characteristics

Optical characteristics of each of the birefringent films obtained in Examples and Comparative examples were measured in the state where the birefringent film was laminated with a glass plate, after being transferred onto a glass plate using an acrylic adhesive so as to peel off from the base. An in-plane retardation value $\Delta nd=(nx-ny) \times d$ of the birefringent film and a retardation value $Rth=(nx-nz) \times d$ in a thickness direction of the film were measured at a measurement wavelength $\lambda$ of 590 nm, using an automatic retardation analyzer (trade name: KOBRA-21ADH, manufactured by Oji Scientific Instruments). Optical characteristics of the glass plates measured beforehand were substantially isotropic both in its in-plane direction and its thickness direction. The amount of change in Rth, which shows thermal stability of the Rth, was obtained by measuring a difference of the retardation value in the thickness direction before and after heating the film at 100° C. for 24 hours using an oven. Further, a light transmittance T (%) of the film was measured using a spectrophotometer (trade name: UV-3150, manufactured by Shimadzu Corporation).

Appearance Uniformity

Appearance uniformity was judged by visual recognition on the following basis.

A: unevenness of the thickness or foaming was not found

B: small unevenness of the thickness and some foaming was found.

C: large unevenness of the thickness and much foaming was found.

Polyimide (weighted average molecular weight (MW) of 135,000) having the repeating unit represented by the following structural formula, which was synthesized by 2,2-bis(3,4-dicarboxyphenyl)hexafluoropropane (6FAD) and 2,2'-bis(trifluoromethyl)-4,4'-diaminobiphenyl (PFMB), was dissolved in methylisobutylketone so as to prepare a polyimide solution of 15 wt %. This polyimide solution was applied on a triacetylcellulose (TAC) film base of approximately 80 μm in thickness, and was heated at 80° C. for 30 minutes, thereafter, was dried by heat at 180° C. for 30 minutes so as to obtain a birefringent film with a negative uniaxiality. Next, this birefringent film and the base therewith were stretched by fixed-end uniaxial stretching by 5% at 150° C. so as to obtain, on the stretched base, a birefringent film with an optical biaxiality having a thickness of 6.0 μm. Optical characteristics of this birefringent film were: Δnd=50.5 nm; Rth=272.3 nm; and (nx−nz)/(nx−ny)=5.4. The amount of a remaining solvent was 0.76 wt %.

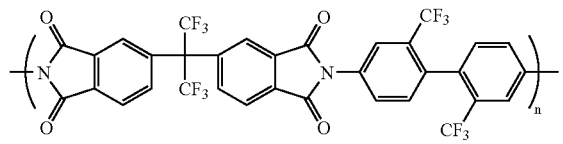

EXAMPLE 2

A polyimide solution that was the same as the polyimide solution of Example 1 was applied onto a TAC film base that was the same as the TAC film base of Example 1, and was heated at 100° C. for 30 minutes, thereafter, was dried by heat at 180° C. for 30 minutes so as to obtain a birefringent film with a negative uniaxiality. Next, this birefringent film was stretched in the same manners as Example 1, thereby obtaining, on the stretched base, a birefringent film with an optical biaxiality having a thickness of 6.0 μm. Optical characteristics of this birefringent film were: Δnd=50.9 nm; Rth=271.8 nm; and (nx−nz)/(nx−ny)=5.3. The amount of a remaining solvent was 0.73 wt %.

EXAMPLE 3

A polyimide solution that was the same as the polyimide solution of Example 1 was applied onto a TAC film base that was the same as the TAC film base of Example 1, and was heated at 120° C. for 30 minutes, thereafter, was dried by heat at 180° C. for 30 minutes so as to obtain a birefringent film with a negative uniaxiality. Next, this birefringent film was stretched in the same manner as Example 1, thereby obtaining, on the stretched base, a birefringent film with an optical biaxiality having a thickness of 6.0 μm. Optical characteristics of this birefringent film were: Δnd=50.1 nm; Rth=270.5 nm; and (nx−nz)/(nx−ny)=5.4. The amount of a remaining solvent was 0.69 wt %.

COMPARATIVE EXAMPLE 1

A polyimide solution that was the same as the polyimide solution of Example 1 was applied onto a TAC film base that was the same as the TAC film base of Example 1, and was dried by heat at 100° C. for 30 minutes so as to obtain a birefringent film with a negative uniaxiality. Next, this birefringent film was stretched in the same manner as Example 1, thereby obtaining, on the stretched base, a birefringent film with an optical biaxiality having a thickness of 6.0 μm. Optical characteristics of this birefringent film were: Δnd=50.7 nm; Rth=253.7 nm; and (nx−nz)/(nx−ny)=5.0. The amount of a remaining solvent was 6.3 wt %.

COMPARATIVE EXAMPLE 2

A polyimide solution that was the same as the polyimide solution of Example 1 was applied onto a TAC film base that was the same as the TAC film base of Example 1, and was dried by heat at 150° C. for 30 minutes so as to obtain a birefringent film with a negative uniaxiality. Next, this birefringent film was stretched in the same manner as Example 1, thereby, obtaining, on the stretched base, a birefringent film with an optical biaxiality having a thickness of 6.0 μm. Optical characteristics of this birefringent film were: Δnd=50.8 nm; Rth=246.1 nm; and (nx−nz)/(nx−ny)=4.8. The amount of a remaining solvent was 3.5 wt %.

COMPARATIVE EXAMPLE 3

A polyimide solution that was the same as the polyimide solution of Example 1 was applied onto a TAC film base that was the same as the TAC film base of Example 1, and was dried by heat at 180° C. for 30 minutes so as to obtain a birefringent film with a negative uniaxiality. Next, this birefringent film was stretched in the same manner as Example 1, thereby obtaining, on the stretched base, a birefringent film with an optical biaxiality having a thickness of 6.0 μM. Optical characteristics of this birefringent film were: Δnd=51.0 nm; Rth=240.7 nm; and (nx−nz)/(nx−ny)=4.7. The amount of a remaining solvent was 0.9 wt %.

With regard to each of the birefringent films with optical biaxialities, which are obtained in the above-mentioned Examples and Comparative examples, thermal stability of the Rth, appearance uniformity and a light transmittance with respect to light with λ of 590 were measured. The results are shown in Table 1.

TABLE 1

| | Former cure temperature (° C.) | Latter cure temperature (° C.) | Δnd (nm) | Rth (nm) | Change of Rth (nm) | Appearance uniformity | Transmittance (%) | Amount of a remaining solvent (wt %) |
|---|---|---|---|---|---|---|---|---|
| Example 1 | 80 | 180 | 50.5 | 272.3 | less than 3 | A | 92.1 | 0.76 |
| Example 2 | 100 | 180 | 50.9 | 271.8 | less than 3 | A | 91.5 | 0.73 |
| Example 3 | 120 | 180 | 50.1 | 270.5 | less than 3 | A | 91.8 | 0.69 |
| Comparative example 1 | 100 | — | 50.7 | 253.7 | 17.6 | A | 91.8 | 6.3 |
| Comparative example 2 | 150 | — | 50.8 | 246.1 | 8.3 | B | 91.3 | 3.5 |
| Comparative example 3 | 180 | — | 51.0 | 240.7 | 4.5 | C | 90.9 | 0.9 |

As shown in Table 1, in Comparative example 1 to 3 which do not include any drying steps as latter cures, when the drying temperature increased, both the Rth and the transmittance with respect to light with λ of 590 deteriorated, and the appearance uniformity was not so good. In addition, in Comparative example 1 to 3, when the drying temperature decreased, the change of Rth increased and stability of the retardation value deteriorated. On the other hand, since Example 1 to 3 includes the drying steps as a former cure and a latter cure, the birefringent films manufactured in these examples are superior in stability of the retardation value, light transmittance and appearance uniformity, and they have larger value of Rth and smaller change of Rth in comparison with all of Comparative examples.

As described above, according to the manufacturing method of the present invention, the amount of a remaining solvent in a birefringent film can be reduced without degrading appearance uniformity of an optical film. Therefore, an optical film including a birefringent film with an optically negative uniaxiality or an optically negative biaxiality, which has stable optical characteristics such as thermal stability of a retardation value and the like, can be manufactured. In addition, according to the manufacturing method of the present invention, since a birefringent film having an excellent alignment in a thickness direction can be manufactured, a thickness of the optical film can be reduced, whereby, for example, thicknesses of various image display apparatuses and manufacturing costs thereof also can be reduced by use of the optical film.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. A method for manufacturing a birefringent film having a birefringent index $\Delta Nxz=nx-nz$ in a thickness direction, which is determined by $\Delta Nxz=nx-nz$ being (i) 0.002 or larger and (ii) smaller than 0.12, comprising the steps of:

coating a base with a polymer solution obtained by dissolving a polyimide-containing polymer in a solvent so as to form a coating film; and drying the coating film so as to form a birefringent film, wherein the drying step comprises at least two stages of drying processes, and an amount of a remaining solvent in the birefringent film after a latter stage of the drying process is 3 wt % or less.

2. The manufacturing method according to claim 1, wherein a temperature in a former stage of the drying process is lower than a temperature in the latter stage of the drying process.

3. The manufacturing method according to claim 1, wherein a blend ratio of the polymer to the solvent ranges from 5 to 50 parts by weight with respect to the solvent of 100 parts by weight.

4. The manufacturing method according to claim 2, wherein a temperature in the former stage of the drying process is 40° C. or higher and lower than 150° C.

5. The manufacturing method according to claim 2, wherein a thickness of the birefringent layer ranges from 0.2 to 20 μm.

6. The manufacturing method according to claim 2, wherein a temperature in the latter stage of the drying process is 150° C. or higher and lower than 350° C.

7. The manufacturing method according to claim 1, wherein the polyimide has a repeating unit represented by the following structural formula

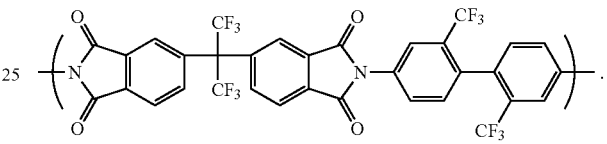

8. The manufacturing method according to claim 1, wherein the solvent is one kind or a mixture of plural kinds selected from the group consisting of dimethylacetamide, dimethylformamide, N-methyl-2-pyrrolidone, dichloromethane, trichloroethylene, tetrachloroethane, cyclohexanone, cyclopentanone, methylethylketone, methylisobutylketone, diethyleneglycoldimethylether, toluene, ethyl acetate and tetrahydrofuran.

9. The manufacturing method according to claim 1 further comprising a step of providing, to the birefringent film, an anisotropy of a refractive index in an in-plane direction so as to form a birefringent film with an optical biaxiality.

10. The manufacturing method according to claim 9, wherein the anisotropy is provided by at least one of a stretching treatment and a shrinking treatment performed in the step of providing the anisotropy of the refractive index in an in-plane direction.

* * * * *